United States Patent
Kawamoto et al.

(10) Patent No.: US 8,049,140 B2
(45) Date of Patent: Nov. 1, 2011

(54) PULSE ARC WELDING CONTROL METHOD AND PULSE ARC WELDING DEVICE

(75) Inventors: Atsuhiro Kawamoto, Hyogo (JP); Yasushi Mukai, Osaka (JP); Masaru Kowa, Osaka (JP)

(73) Assignee: Panasonic Corporation, Osaka (JP)

( * ) Notice: Subject to any disclaimer, the term of this patent is extended or adjusted under 35 U.S.C. 154(b) by 933 days.

(21) Appl. No.: 10/582,085

(22) PCT Filed: Nov. 14, 2005

(86) PCT No.: PCT/JP2005/020796
§ 371 (c)(1),
(2), (4) Date: Jun. 8, 2006

(87) PCT Pub. No.: WO2006/129388
PCT Pub. Date: Dec. 7, 2006

(65) Prior Publication Data
US 2009/0152252 A1   Jun. 18, 2009

(30) Foreign Application Priority Data
May 31, 2005   (JP) .................... 2005-158724

(51) Int. Cl.
*B23K 9/095*   (2006.01)
(52) U.S. Cl. ........ 219/137 PS; 219/130.21; 219/130.31; 219/130.32
(58) Field of Classification Search .......... 219/130.31–130.33, 130.21, 130.51, 219/137 PS
See application file for complete search history.

(56) References Cited

U.S. PATENT DOCUMENTS

| | | | | |
|---|---|---|---|---|
| 3,376,473 A | * | 4/1968 | Oku ............................. | 315/291 |
| 5,001,326 A | * | 3/1991 | Stava ...................... | 219/137 PS |
| 5,824,991 A | * | 10/1998 | Mita et al. ................ | 219/130.51 |
| 6,160,241 A | * | 12/2000 | Stava et al. ............... | 219/130.21 |
| 6,172,333 B1 | * | 1/2001 | Stava ...................... | 219/137 PS |
| 6,215,100 B1 | * | 4/2001 | Stava ...................... | 219/130.51 |
| 6,255,618 B1 | * | 7/2001 | Shintani et al. .......... | 219/121.46 |
| 6,274,845 B1 | * | 8/2001 | Stava et al. ............... | 219/125.12 |
| 6,501,049 B2 | * | 12/2002 | Stava ...................... | 219/137 PS |

FOREIGN PATENT DOCUMENTS

| | | |
|---|---|---|
| JP | 63-273569 | 11/1988 |
| JP | 01-266966 | 10/1989 |
| JP | 08-132233 | 5/1996 |
| JP | 09-141430 | 6/1997 |
| JP | 2004-160496 | 6/2004 |

OTHER PUBLICATIONS

Machine Translation of JP 2563465.* Extended European Search Report (including Supplementary European Search Report and the European Search Opinion) issued Sep. 29, 2009 in corresponding European Application No. 05 80 6062.

* cited by examiner

*Primary Examiner* — Tu B Hoang
*Assistant Examiner* — Brian Jennison
(74) *Attorney, Agent, or Firm* — Wenderoth, Lind & Ponack, L.L.P.

(57) ABSTRACT

Disclosed here is a pulse welding control method and a pulse arc welding device capable of improving arc stability, and decreasing the amount of spatters. The structure contains arc short-circuit judging section (13) for judging a welding state; setting section (21) for defining parameters used for a short-circuit period and an arc period; secondary control section (25); and driving section (18). Secondary control section (25) sharply decreases welding current on detecting a moment when the tip of a wire has a neck just before recovery from the short circuit, according to at least any one of outputs from a welding current value detector, a welding voltage value detector, and the setting section. Driving section (18) selects from outputs of a pulse-waveform circuit section and a dip-waveform circuit section according to the signal from the setting section and the output from the arc short-circuit section, and outputs the selected data to a switching element.

16 Claims, 2 Drawing Sheets

PULSE ARC WELDING CONTROL METHOD AND PULSE ARC WELDING DEVICE

TECHNICAL FIELD

The present invention relates to a pulse arc welding control method capable of controlling welding output by automatically feeding a consumable electrode (hereinafter referred to as a wire) and alternately feeding peak current and base current between a wire and a welding base material (hereinafter, a base material), and also relates to a pulse arc welding device employing the method.

BACKGROUND ART

In the welding industry, the need for accelerating welding speed and reducing the amount of spatters has intensified in recent years. The accelerated welding speed leads to increase in the volume of production in a fixed time. Similarly, the suppressed spatters eliminate the post-welding process for removing spatters from a work, thereby increasing productivity of welding.

Pulse welding output control has conventionally begun with the start of the output of pulse current. When an arc is properly provided with no short-circuit between a wire and a base metal after a predetermined second period that is shorter than a first period as a basic pulse interval, a pulse welding output controller feeds a successive pulse current according to the basic pulse interval.

On the other hand, when a short circuit occurs between the wire and the base material after the second period, the controller feeds a current having a speed lower than a pulse-rising speed of pulse current. When the short circuit between the wire and the base material is recovered, the controller feeds a current so as to be smaller than a pulse current and to be larger than a base current for a predetermined period. After that, the controller feeds the next pulse current. Suggestions on reducing spatters in welding have been made, and one of which is introduced in, for example, Japanese Patent Unexamined Publication No. H01-266966.

Hereinafter will be described a pulse welding control in a conventional pulse arc welding device with reference to FIG. 4. FIG. 4 shows a current waveform in a conventional output control in a conventional pulse arc welding device. FIG. 4 shows time in the horizontal direction and shows welding current in the vertical direction. FIG. 4 also shows first pulse intervals 101-1 and 101-2; short-circuit period 102 during which a short-circuited condition is maintained between a wire and a base material; and arc initial time (period) 103 for preparing a melted nugget for forming droplets after the short circuit is recovered.

At time 106—the end of basic pulse interval 101-2, the wire and the base material maintain a short-circuited condition. During short-circuit period 102 including time 106, a welding current controller maintains a short-circuit control. After the short circuit is recovered, the controller feeds arc current 105L—lower than peak current 105, and arc current 104H—higher than base current 104—in arc initial period 103 to prepare a melted nugget for forming droplets for next welding. After a lapse of arc initial period 103, the controller applies pulse current. Through the control above, spatters have been decreased.

To be more specific, according to a conventional pulse arc welding device, when a short circuit occurs, the output controller of the device carries out with a higher priority the short-circuit control by a dip-waveform circuit section (not shown), meanwhile the pulse control by a pulse-waveform circuit section is put into a standby mode. In this way, spatters have been reduced.

Such an output control of a conventional pulse arc welding device, however, has pending problems. For example, seeking for more accelerated welding speed (e.g., higher than 1.5 m/min.), with a high welding current (e.g., 250-350 A) maintained, causes undercut and humping. To avoid these inconveniencies, lower welding voltage is required. The lower setting of welding voltage not only prolongs the short-circuit period (from the occurrence of a short circuit until the short circuit is recovered), but also increases the amount of current supplied when the short circuit is recovered. The higher the welding current (for example, set at 300 amperes), the shorter the base period. Such a prolonged short-circuit period in the high current region of the basic pulse interval causes delay in pulse-starting time for the next pulse. This prevents a wire fed according to a defined welding current from having a proper melt, resulting in unstable arc condition.

SUMMARY OF THE INVENTION

The object of the present invention is therefore to provide a pulse arc welding control method and a pulse arc welding device capable of offering desirable welding having a stable arc and a decreased amount of spatters, with welding current maintained high (for example, approx. 250-350 A), even in a condition of a suppressed welding voltage for accelerating the welding speed.

To address the aforementioned inconveniencies, in the pulse arc welding control method of the present invention, a peak current and a base current are alternately supplied, in the form of a pulse, between a welding wire and a welding base material. When detecting a short circuit between a welding wire and a welding base material, an output controller supplies a current having a gradient smaller than that of the pulse rise of the waveform of pulse current. After detecting a neck portion just before the short circuit is recovered, the controller sharply decreased welding current.

The pulse arc welding device of the present invention contains a switching element for controlling welding output; a welding current value detector for detecting welding output current; a welding voltage value detector for detecting welding output voltage; an arc short-circuit judging section; a setting section; a pulse-waveform circuit section; a dip-waveform circuit section; a secondary control section; and a driving section. The arc short-circuit judging section judges whether the welding condition is in a short-circuit period or in an arc period. The setting section determines parameters for the short-circuit period and the arc period. The pulse-waveform circuit section receives at least one of outputs from the welding current value detector, the welding voltage value detector, and the setting section to control pulse output in the arc period. The dip-waveform circuit section receives at least one of the outputs from the welding current value detector, the welding voltage value detector, and the setting section to control pulse output in the short-circuit period. The secondary control section receives at least one of the outputs from the welding current value detector, the welding voltage value detector, and the setting section to detect the moment at which the tip of a wire have a neck just before a short circuit is recovered. On detecting a neck, the secondary control section sharply decreases welding current. According to a signal received from the setting section and an output from the arc short-circuit judging section, the driving section selects an output from the outputs of the pulse-waveform circuit section, the dip-waveform circuit section, and the secondary control section, and then feeds the selected output to the switching element.

With the structure above, on detecting a neck that appears just before recovery from a short circuit, the pulse arc welding device sharply decreases welding current. That is, the short circuit is recovered under a low welding current, so that the amount of spatters can be reduced.

According to an aspect of the pulse arc welding control method of the present invention, when a short circuit occurs in pulse welding, in response to detecting a neck that appears just before recovery from the short circuit, welding current is sharply decreased, and then, in response to detecting the recovery from the short circuit, the welding current is now sharply increased.

According to another aspect of the pulse arc welding device of the present invention, on detecting the moment at which the tip of a wire has a neck just before the recovery from a short circuit, the secondary control section sharply decreases welding current. After that, on detecting the recovery from the short circuit, the secondary control section now sharply increases the welding current. The output control prevents lack of arc.

According to another aspect of the pulse arc welding control method, in response to detecting a short circuit between a wire and a base material, welding current is sharply decreased, and then a current having a gradient smaller than that of the pulse rise of the waveform of pulse current is supplied.

As still another aspect of the pulse arc welding device of the present invention, the secondary control section sharply decreases welding current also at the moment when a short circuit occurs according to a signal fed from the arc short-circuit judging section. That is, the device sharply decreases welding current at the moment when a short circuit occurs, reducing the amount of spatters.

As still another aspect of the pulse arc welding control method, the gradient of a current waveform under a short-circuited condition is changed according to a lapse of time since the short circuit occurred or according to output voltage. According to the control method, the longer the period from the moment of the short circuit, the greater the gradient of the current waveform in the short-circuited condition.

As still another aspect of the pulse arc welding device of the present invention, the gradient of a current waveform under a short-circuited condition is changed according to a lapse of time since the short circuit has occurred or according to output voltage. According to the control of the device, the longer the period from the moment of the short circuit, the greater the gradient of the current waveform in the short-circuited condition. The control of a waveform gradient shortens short-circuit duration and improves arc stability.

As yet another aspect of the pulse arc welding device of the present invention, the setting section can define a lower limit value of welding current to prevent an excessive decrease, thereby preventing lack of arc when the welding current is sharply decreased.

In this way, the present invention decreases the amount of spatters when a short circuit occurs in pulse welding, and improves arc stability.

Figure 1:
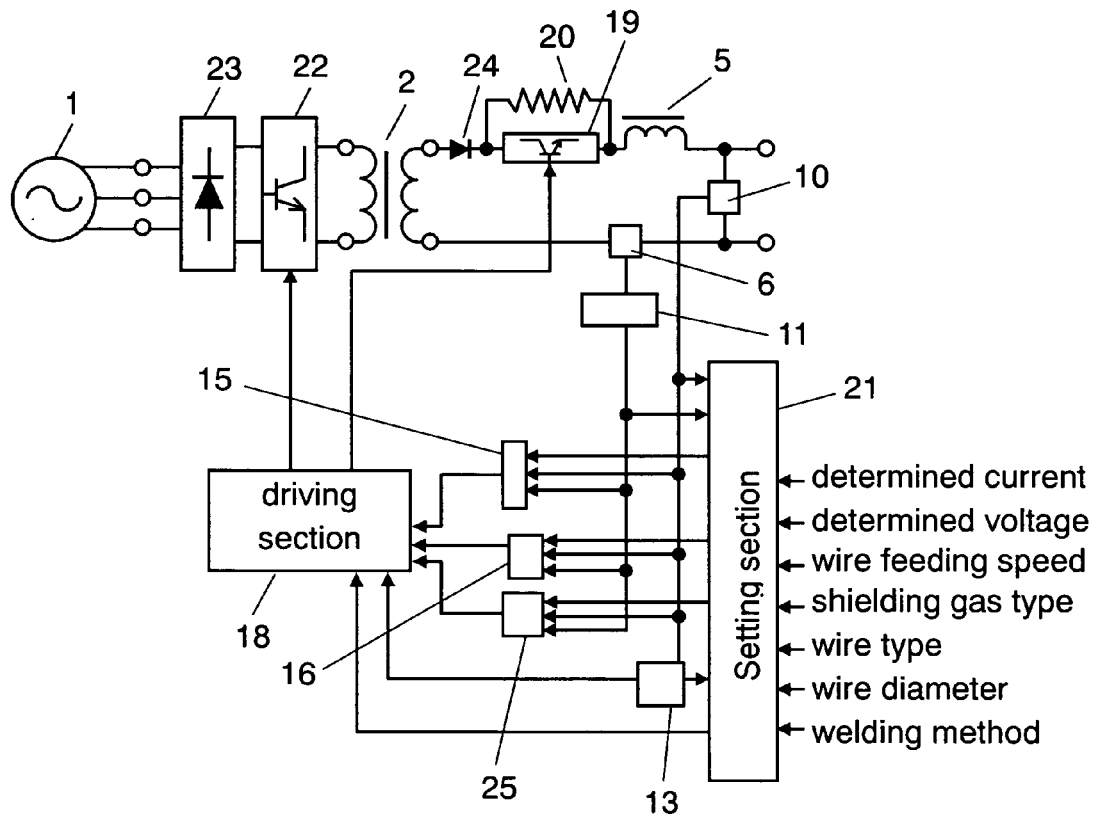
FIG. 1 is a schematic block diagram of a pulse arc welding device in accordance with a first and a second exemplary embodiments of the present invention.

REFERENCE MARKS IN THE DRAWINGS 1 input power supply
2 transformer
3 rectifying/smoothing circuit section
4 welding output control element
5 reactor
6 shunt
7 output terminal
8 contact chip for energization
9 welding wire
10 welding voltage detector
11 welding current detector
12 base material
13 arc short-circuit judging circuit section
14 dip pulse control circuit
15 pulse-waveform circuit section
16 dip-wave form circuit section
17 switching element
18 driving circuit section
20 resistor
21 setting section
22 primary switching element
23 primary rectifying element
24 secondary rectifying element
25 secondary control section
101-1, 101-2 basic pulse interval
102 short-circuit period
103 arc initial period
104 base current
104H, 105L arc current
105 peak current
106 pulse-starting time
107 neck control
108 short-circuit initial control
109 current gradient
109a current gradient a
110 pulse-starting time
110a pulse-starting time a

DETAILED DESCRIPTION OF THE PREFERRED EMBODIMENTS

First Exemplary Embodiment

Hereinafter will be described the structure of the first exemplary embodiment with reference to FIGS. 1 and 2. In the drawings, the same parts as those shown in FIG. 4 that illustrates a control method employed for a conventional pulse arc welding device described in Background Art are designated by similar marks, and a detailed explanation thereof will be omitted.

FIG. 1 schematically shows the structure of the arc welding device of the first exemplary embodiment. In the arc welding device of the present invention, input power supply 1 is connected to primary rectifying element 23 that rectifies the output of input power supply 1. Receiving the output from primary rectifying element 23, primary switching element 22 controls welding output. Receiving the output from primary switching element 22, transformer 2 provides power conversion. Secondary rectifying element 24 rectifies the secondary output of the transformer. Secondary switching element 19 is connected in series with secondary rectifying element 24. Resistor 20 is connected in parallel with secondary switching element 19. Reactor 5 is connected in series with secondary switching element 19.

The pulse arc welding device of the present invention further contains a welding voltage value detector 10 for detecting welding voltage; and shunt 6. Receiving the output from shunt 6, welding current value detector 11 detects welding current. Shunt 6 and welding current value detector 11 can be integrally formed, instead of being separately installed.

According to setting conditions, such as welding current, welding voltage, wire feeding speed, shielding gas types, wire types, wire diameter, welding method, setting section 21 defines parameters suitable for the conditions and outputs them. Receiving the output from welding voltage value detector 10, arc short-circuit judging section 13 determines whether the welding state is in a short-circuit period or in an arc period, and then outputs an arc short-circuit signal. Pulse-waveform circuit section 15 controls pulse waveforms according to at least any one of outputs from welding voltage value detector 10, welding current value detector 11, and setting section 21. Dip-waveform circuit section 16 carries out a short-circuit process by controlling primary switching element 22 during the short-circuited state and after the recovery from the short circuit, according to at least any one of outputs from welding voltage value detector 10, welding current value detector 11, and setting section 21. Secondary control section 25 outputs a signal to sharply decrease welding current when a constriction (or a neck) appears just before a short circuit is recovered, according to at least any one of outputs from welding voltage value detector 10, welding current value detector 11, and setting section 21. Driving section 18 drives primary switching element 22 and secondary switching element 19 according to the outputs from pulse-waveform circuit section 15, dip-waveform circuit section 16, secondary control section 25, arc short-circuit judging section 13, and setting section 21.

Here will be described the workings of the pulse arc welding device structured above. FIG. 2 shows a waveform of welding current when a short circuit occurs in accordance with the first exemplary embodiment. As an example of welding current control, FIG. 2 shows neck control region 107 where the welding current undergoes a sharp decrease by a neck control. More in-detail explanation will be described later.

Figure 2:
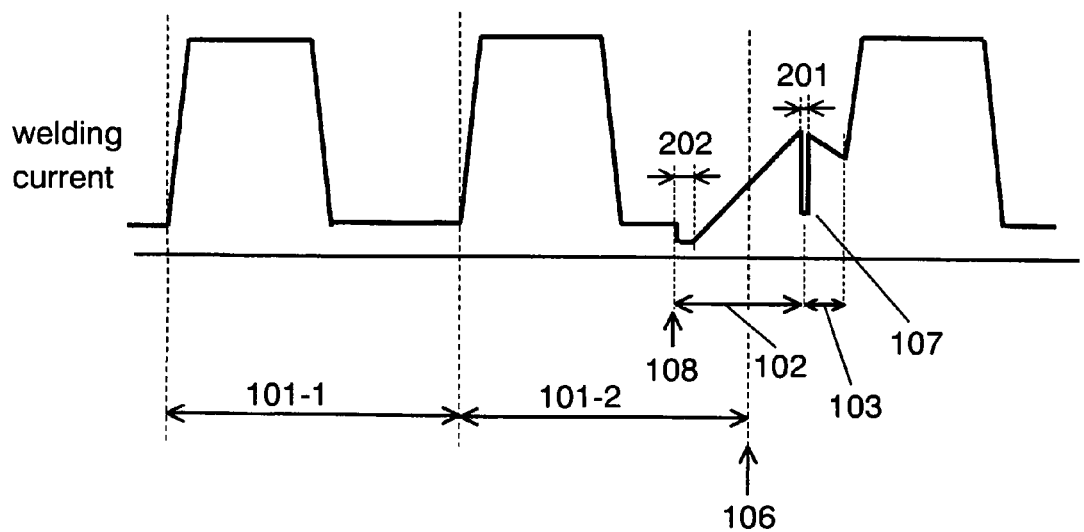
FIG. 2 shows a waveform of welding current employed for the pulse arc welding control in accordance with the first and the second exemplary embodiments of the present invention.
Figure 4:
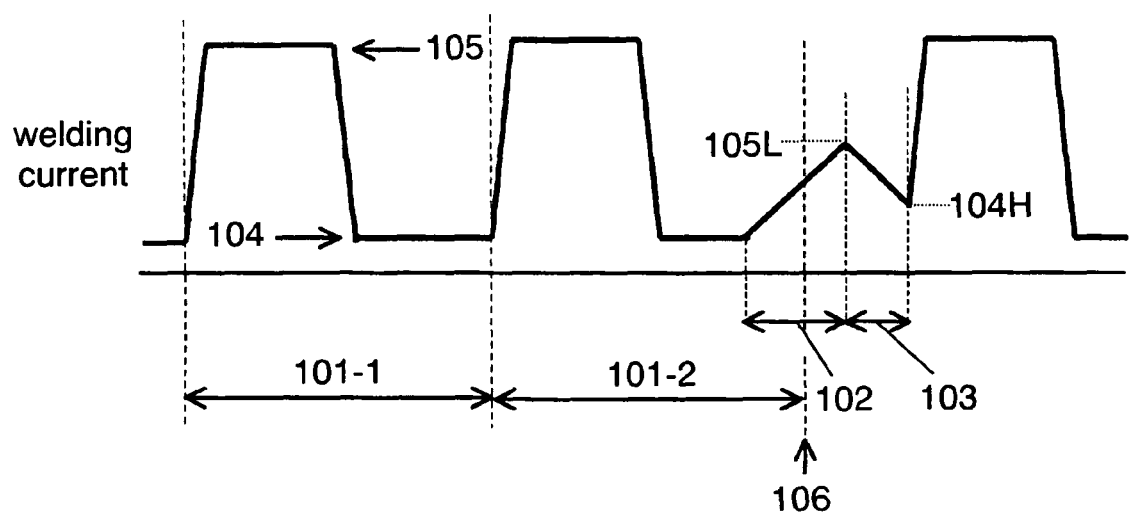
FIG. 4 shows a waveform of welding current employed for a conventional pulse arc welding control.

In the first exemplary embodiment, description of the short-circuit control description is given on a case where a short circuit occurs at the moment of short-circuit initial control 108 in basic pulse interval 101-2 shown in FIG. 2. Because the short-circuit condition still has been kept at pulse-starting time 106 of basic pulse interval 101, the short-circuit control similar to that shown in FIG. 4 is continuing. When detecting a neck just before the recovery from the short circuit according to outputs from welding voltage value detector 10 and the like, secondary control section 25 sends a neck-control signal to driving section 18. Receiving the neck-control signal, driving section 18 sends a signal to secondary switching element 19 to cut it off. Once switching element 19 has no longer electrical connection, energy of welding current is consumed at resistor 20, whereby welding current undergoes a sharp drop, as shown in neck control region 107 in FIG. 2. When welding current is decreased on detection of a neck just before recovery from a short circuit, a melted wire is pulled to a base material by a pinching force. Therefore, recovery from a short circuit has no ill effect on a wire.

As described above, when a short circuit occurs in pulse welding, the device of the present invention supplies a current having a gradient smaller than that given at a pulse rise of the waveform of pulse current to recover from the short circuit. The application of current allows a controller of the device to detect a neck and to sharply decrease welding current. The current control can minimize an undesired effect on spatters generated at the recovery from the short circuit, so that the amount of spatters can be reduced.

After the short circuit is recovered, an arc initial control for preparing a melted nugget for forming droplets is carried out in arc initial period 103 of FIG. 2. This is the same process as that performed in a conventional pulse arc welding device. After the lapse of arc initial period 103, an application of pulse current allows the droplets to spray off to continue the welding process.

As a means for sharply decreasing welding current, other electric components, such as a capacitor, can be employed.

According to the pulse arc welding device of the embodiment, on detecting a neck portion just before the recovery from a short circuit, the device sharply decreases welding current. On detecting the recovery from the short circuit, the device now sharply increases the welding current, preventing lack of arc due to the sharp decrease in the welding current. The timing of sharp increase in welding current can be shifted to a moment at which time 201 has passed since the neck detection. In this case, time 201 can be defined on parameters used for the welding, such as a feeding speed of wires.

A pulse arc welding device undergoes a sharp change in electric current at a rise time and a fall time of pulses. Therefore, the device employs a reactor having an extremely small inductance, compared to that used for a welding device for short-circuit welding. When the pulse arc welding device undergoes a sharp decrease on detecting a neck portion, current has an excessive low value due to the small inductance. For example, a current lower than 100 A can cause a lack of arc. Conventionally, technical suggestions that aim at combining pulse welding with current control in which welding current undergoes a sharp decrease when a neck occurs have never been made. Establishing compatibility between the pulse welding and the current control above has obtained little success.

To avoid a lack of arc, the pulse arc welding device of the embodiment contains a controller that defines a lower limit value (e.g., 100 A) and controls the current so as not to have an excessive decrease upon the occurrence of a neck. After an arc is generated under a sharply decreased welding current, the device of the present invention now increases the welding current, thereby establishing compatibility between the pulse welding and the current control. A constant-current control at a lower limit value is considered to be useful for keeping welding current so as not to have a value below the lower limit value.

Second Exemplary Embodiment

Here will be described the control method of the pulse arc welding device of the second exemplary embodiment with reference to FIG. 1 and FIG. 2. In the embodiment, the same parts as those of the structure described in the first exemplary embodiment are designated by similar marks, and a detailed explanation thereof will be omitted.

The control method of the second embodiment differs from that of the first embodiment in that secondary controller 25 controls switching element 19 so as to sharply decrease welding current not only when a short circuit is recovered but also when a short circuit occurs.

In arc welding, generally, the higher the welding current value when a short circuit occurs, the larger the amount of spatters. In the welding device of the embodiment, on detecting a short circuit, arc short-circuit judging section 13 sends a short-circuit detecting signal to setting section 21. In response to the signal, setting section 21 immediately outputs a parameter for decreasing current to secondary controller 25. Receiving the parameter, secondary controller 25 sends a control signal to driver 18. In response to the signal, driver 18 turns secondary switching element 19 off (that is, no electrical connection). In this way, when a short circuit occurs at short-circuit initial control 108 in FIG. 2, the device can sharply decrease welding current, thereby reducing the amount of spatters at the occurrence of a short circuit occurs.

Like in the first embodiment, a controller of the device of the second embodiment sets a lower limit on welding current, and carries out a constant-current control for predetermined period 202 at a current kept higher than the lower limit. After a lapse of period 202, the current control should preferably be carried out so that the current increases with a gradient as shown in FIG. 2. Predetermined period 202 can be set according to the welding current.

In pulse welding, a short circuit occurred in a peak current period or at a pulse fall time, due to a high value (up to approx. 500 A) of welding current, causes a large amount of spatters. However, according to the current control above, that is, controlling welding current so as to sharply decrease the current upon the occurrence of a short circuit can reduce the amount of spatters. This is particularly effective in the case where a short circuit occurs in a large current flow. To quickly consume the energy of the current, other electric components, such as a capacitor, can be employed.

Although the second embodiment introduces a case where welding current is sharply decreased so as to be timed with the occurrence of a short circuit and with the recovery from the short circuit, it is not limited thereto. Decreasing the current only at the occurrence of a short circuit is also effective in reducing the amount of spatters.

Third Exemplary Embodiment

Figure 3:
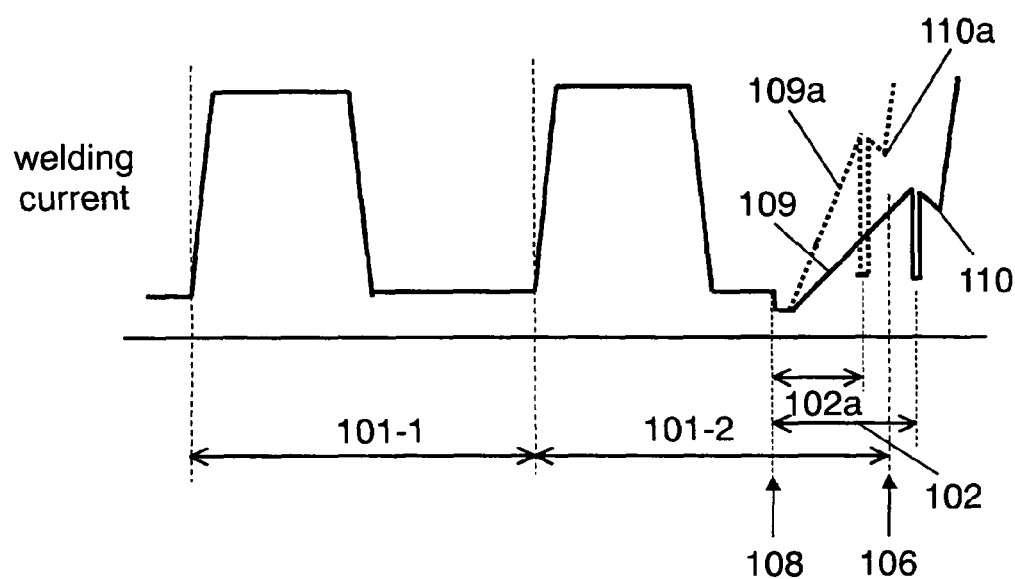
FIG. 3 shows a waveform of welding current employed for the pulse arc welding control in accordance with a third exemplary embodiments of the present invention.

Here will be described the control method of the pulse arc welding device of the third exemplary embodiment with reference to FIG. 3. In the embodiment, the same parts as those of the structure described in the first exemplary embodiment are designated by similar marks, and a detailed explanation thereof will be omitted. The control method of the third embodiment differs from the method described in the first embodiment in that, according to the condition of a short circuit, setting section 21 changes the gradient of a waveform of current applied for recovering from a short-circuit, as shown in FIG. 3. The detailed description will be given later. The dotted lines in FIG. 3 show a case where a waveform with a steeper gradient is applied to recover from a short circuit.

Hereinafter will be described the control method of the pulse arc welding device of the embodiment. The description is firstly given on an example in which pulse rise time has a delay due to the occurrence of a short circuit. After that, description will be given on how to shorten the delay time by the control method of the third exemplary embodiment.

FIG. 3 shows basic pulse interval 101-1 as a first one of a pulse train, and basic pulse interval 101-2 as a second one. FIG. 3 shows pulse-starting time 106 at which a third basic pulse interval is supposed to start. A short circuit occurs at short-circuit initial control 108 and continues during short-circuit period 102. That is, the short-circuit condition is still kept on the moment of pulse-starting time 106. According to the condition above, the controller of the device keeps applying welding current with gradient 109. When the short circuit is recovered at the end of short-circuit period 102, the device completes an arc initial control (not shown) similar to that shown in the first embodiment, and then the device starts application of pulses at pulse-starting time 110. As a result, pulse-starting time 106 is shifted to pulse-starting time 110. Occurrence of such a condition at frequent intervals causes delay in pulse-starting time, which fails to increase welding voltage to a predetermined value. This invites poor heat input, resulting in unstable arc.

According to the device of the third embodiment, to address the problem above, when the short-circuit control delays a pulse-starting time, that is, when output voltage does not reach a predetermined welding voltage, setting section 21 (of FIG. 1) outputs corrected value 109a that has a gradient steeper than current gradient 109 to dip-waveform circuit section 16. Adding steepness to the gradient of a waveform of welding current applied in the short-circuit condition according to the output of dip-waveform circuit section 16 can shorten the short-circuit period.

Short-circuit period 102a obtained by application of current with a steeper gradient (gradient 109a) is apparently shorter than short-circuit period 102 where current gradient 109 is employed.

As described above, according to the delay in pulse-starting time or output voltage, controlling the gradient of a waveform of welding current applied in the short-circuit condition can shorten the short-circuit period from period 102 to period 102a, accordingly, pulse-starting time 110 is shifted ahead to pulse-starting time 110a (i.e., to time 106). By virtue of the aforementioned control, a delay in pulse-starting time of pulse interval is minimized, whereby arc stability can be improved.

A delay in pulse-starting time and an undesired decrease in output voltage are monitored and detected by setting section 21.

Besides, a delay in pulse-starting time or an undesired decrease in output voltage detected in the immediately preceding short-circuit is reflected on gradient control for the waveform of welding current in the short circuit that follows.

As another applicable gradient control of a waveform of welding current, when a short circuit condition still remains at pulse-starting time 106, a gradient control that provides welding current with a gradient steeper than the gradient of the current applied until then is also effective. The control above allows the corrected gradient to be applicable to the right-now condition, with no wait until the following short-circuit, so that a short-circuit period is shortened.

As still another example, the device may carry out a gradient control below. According to an arc short-circuit signal from arc short-circuit judging section 13, setting section 21 calculates a lapse of time since the short circuit occurred. When a predetermined time has passed since the short circuit occurred, the device controls the waveform of the current so as to have a steeper gradient. In this case, the current can be controlled so that the gradient gets steeper with a lapse of time. Changing a gradient value of welding current (that is, applying a steepness to the waveform of the current) with a lapse of a short-circuit time can shorten the short-circuit time. This expands an allowance for the lower limit value of welding voltage, allowing the lower limit to have a further lower value. As a result, the welding speed is accelerated. The control method is particularly effective in a high current range where the interval between the trailing edge of a pulse and the leading edge of the next coming pulse becomes short.

As for the gradient of current that is fed from setting section 21 to dip-waveform circuit section 16, setting section 21 stores, in the form of a table, at least any one of relationships between a delay in the pulse-starting time and a gradient value of current; between an output voltage and a gradient value of current; and between a lapse of time since a short circuit occurred and gradient value of current. According to at least any one of the delay in the pulse-staring time, the output voltage, and the lapse of time since the occurrence of a short circuit, setting section 21 selects a gradient value from the table and outputs it. The table is stored in a rewritable storage, which can be changed according to welding types and conditions. The storage is not necessarily disposed inside setting section 21; it can be an external storage. The gradient value of current can be obtained as a function based on each factor above, not from the table.

Controlling the gradient of current is an effective way in the short-circuit control. In the control, the change in the gradient is not necessarily liner; it may take a zigzagged or a curved line. As another applicable way, the control can be performed by increasing the integral of welding current from the early stage of a short-circuit condition.

INDUSTRIAL APPLICABILITY

The arc welding control method and the arc welding device of the present invention can decrease the amount of spatters. Particularly, the great usefulness in high-speed welding allows the present invention to have a high industrial applicability.

The invention claimed is:

1. A pulse arc welding control method in which a peak current and a base current of a welding current are alternately supplied in a form of a pulse between a welding wire and a welding base material, the method comprising:
    storing a relationship between a lapse of time from a short circuit of the welding wire and the welding base material and a gradient of the welding current, the gradient being smaller than a gradient at a pulse rise of a current waveform of the pulse;
    detecting the short circuit between the welding wire and the welding base material;
    applying the welding current having the gradient smaller than the gradient at the pulse rise of the current waveform of the pulse on detecting the short circuit; and
    decreasing the welding current so as to fall vertically to a first current not smaller than a first predetermined lower limit, the first predetermined lower limit having a current value greater than that of the base current, on detecting a neck that appears just before recovery from the short circuit,
    wherein a length of time elapsed from occurrence of the short circuit is obtained, and the gradient of the current waveform in a short-circuit condition is controlled according to the length of time elapsed from occurrence of the short circuit based on the relationship stored,
    wherein the longer the time elapsed from occurrence of the short circuit, the greater the gradient of the current waveform applied in the short-circuit condition, and
    wherein the welding current is decreased to a second current not smaller than a second predetermined lower limit on detection of the short circuit between the welding wire and the welding base material, the welding current is maintained at the second current for a predetermined period by carrying out constant current control, and then the current having the gradient smaller than the gradient at the pulse rise of the current waveform of the pulse is applied.

2. The pulse arc welding control method of claim 1, further comprising a step of increasing the welding current on detecting the recovery from the short circuit, after the step of decreasing welding current in response to the neck detection just before the recovery from the short circuit.

3. The pulse arc welding control method of claim 1, wherein an output voltage is detected, and the gradient of the current waveform in the short-circuit condition is controlled according to the output voltage.

4. A pulse arc welding device in which a peak current and a base current of a welding current are alternately supplied in a form of a pulse between a welding wire and a welding base material, the device comprising:
    a switching element for controlling welding output current;
    a welding current value detector for detecting welding output current;
    a welding voltage value detector for detecting welding output voltage;
    an arc short-circuit judging section for judging whether a welding state is in a short-circuit period or in an arc period;
    a setting section for defining parameters used for the short-circuit period and the arc period;
    a pulse-waveform circuit section for controlling pulse output in the arc period according to at least any one of outputs from the welding current value detector, the welding voltage value detector, and the setting section;
    a dip-waveform circuit section for controlling output in the short-circuit period according to at least any one of outputs from the welding current value detector, the welding voltage value detector, and the setting section, the dip-waveform circuit setting the welding current to have a gradient smaller than a gradient at a pulse rise of a current waveform of the pulse when the arc short-circuit judging section judges a welding state is in a short-circuit period;
    a secondary control section for decreasing the welding current from a point of the increased gradient so as to fall vertically to a first current not smaller than a first predetermined lower limit, the first predetermined lower limit having a current value greater than that of the base current, on detecting a moment at which a tip of a wire has a neck just before recovery from a short-circuit, according to at least any one of outputs from the welding current value detector, the welding voltage value detector, and the setting section; and
    a driving section that selects from outputs of the pulse-waveform circuit section, the dip-waveform circuit section, the secondary control section according to a signal from the setting section and an output from the arc short-circuit judging section, and sends the selected data to the switching element,
    wherein the setting section stores a relationship between a lapse of time from the short circuit and the gradient value of the welding current, and the dip-waveform circuit section sets the gradient value based on the relationship stored in the setting section, and
    wherein at an occurrence of the short circuit, the secondary control section decreases the welding current to a second current not smaller than a second predetermined lower limit, and the welding current is maintained at the second current for a second predetermined period by carrying out constant current control, according to a signal from the arc short-circuit judging section.

5. The pulse arc welding device of claim 4, wherein the secondary control section decreases the welding current on detecting a moment at which a tip of a wire has a neck just before recovery from a short-circuit, and then increases the welding current on detecting recovery from the short-circuit.

6. The pulse arc welding device of claim 4, wherein the setting section measures a length of time elapsed from occurrence of the short circuit according to the signal from the arc short-circuit judging section, and controls the gradient of the current waveform in a short-circuit condition according to the length of time elapsed from occurrence of the short-circuit.

7. The pulse arc welding device of claim 6, wherein the setting section performs output control so as to increase a steepness of the gradient of the current waveform in the short-circuit condition as the length of time elapsed from occurrence of the short-circuit increases.

8. The pulse arc welding device of claim 4, wherein the setting section changes the gradient of the current waveform in a short-circuit condition according to the welding output voltage from the welding voltage value detector.

9. The pulse arc welding device of claim 4, wherein the setting section defines the first predetermined lower limit.

10. The pulse arc welding control method of claim 2, wherein the welding current is decreased on detection of the short circuit between the welding wire and the welding base material, and then the current having the gradient smaller than the gradient at the pulse rise of the current waveform of the pulse is applied.

11. The pulse arc welding control method of claim 2, wherein the longer the time elapsed from occurrence of the short circuit, the greater the gradient of the current waveform applied in the short-circuit condition.

12. The pulse arc welding device of claim 5, wherein at an occurrence of a short circuit, the secondary control section decreases welding current according to a signal from the arc short-circuit judging section.

13. The pulse arc welding device of claim 5, wherein the setting section measures a length of time elapsed from occurrence of the short circuit according to the signal from the arc short-circuit judging section, and controls the gradient of the current waveform in a short-circuit condition according to the length of time elapsed from occurrence of the short-circuit.

14. The pulse arc welding device of claim 13, wherein the setting section performs output control so as to increase a steepness of the gradient of the current waveform in the short-circuit condition as the length of time elapsed from occurrence of the short-circuit increases.

15. The pulse arc welding device of claim 5, wherein the setting section changes the gradient of the current waveform in a short-circuit condition according to the welding output voltage from the welding voltage value detector.

16. The pulse arc welding device of claim 5, wherein the setting section defines a lower limit of welding current when the welding current is decreased.

* * * * *